United States Patent Office 3,082,155
Patented Mar. 19, 1963

3,082,155
PRODUCTION OF CEPHALOSPORIN C
Brendan Kevin Kelly, West Wickham, Kent, George Arthur Miller, West Harnham, Salisbury, and Richard Charles Codner, Salisbury, England, assignors to National Research Development Corporation, London, England, a British corporation
No Drawing. Filed Dec. 27, 1961, Ser. No. 162,576
Claims priority, application Great Britain Jan. 5, 1961
18 Claims. (Cl. 195—36)

This invention relates to the production of cephalosporin C, and is particularly concerned with processes for the production of cephalosporin C using a mould of the species of which Cephalosporium I.M.I. 49137 is a member. A culture of Cephalosporium sp. strain 8650 has been deposited with American Type Culture Collection and given ATCC accession number 14553.

It is known that when a nutritional substrate is fermented with a cephalosporin-producing mould of the species of which Cephalosporium I.M.I. 49137 is a member, a mixture of antibiotically active materials is obtained. The active materials can be separated from the fermentation liquor and from each other by means of filtration, solvent extraction, ion exchange techniques and the like and two of these materials, namely cephalosporin N and cephalosporin C, are of especial interest and importance. The particular strain Cephalosporium I.M.I. 49137 has been found to give particularly high yields of antibiotic material.

The yield of antibiotic materials obtained by the fermentation depends not only upon the strain of cephalosporium used, but also upon the content of the nutrient medium. Thus it is shown in British Patent No. 754,208 that, when the nutrient medium contains sucrose and/or lactose, a source of organic nitrogen and ammonium acetate, the proportion of cephalosporin N in the antibiotic mixture is greatly increased. Optimum yields of cephalosporin N are obtained where substantially all the organic nitrogen is provided by corn steep liquor, and any replacement of part of the corn steep liquor by another source of organic nitrogen leads to a reduction in the yield of cephalosporin N.

Methods by which increased yields of cephalosporin C produced by fermentation may be obtained have now been investigated and it has been discovered that although, as for cephalosporin N, a better yield of cephalosporin C is obtained when sources of organic nitrogen are present in the nutrient medium, it is not a necessary requirement for the attainment of an optimum yield of cephalosporin C that the sole source of organic nitrogen be corn steep liquor. It is necessary in order to achieve an optimum yield that a small proportion of corn steep liquor be present, but the balance of the organic nitrogen may be supplied by other suitable sources added to the medium. This is of considerable importance, as more readily obtainable and less expensive sources of organic nitrogen than corn steep liquor can be used to provide the balance of organic nitrogen and thus the process cheapened without reducing, but on the contrary somewhat improving the final yield of cephalosporin C.

According to the invention, therefore, there is provided a process for the production of cephalosporin C by the culture of a cephalosporin C-producing mould of the species of which Cephalosporium I.M.I. 49137 is a member in a medium containing suitable nutrient materials therefor, including a source of organic nitrogen, in the presence of molecular oxygen and the separation of Cephalosporium C thereby produced wherein the organic nitrogen source includes corn steep liquor present in a quantity sufficient to provide a proportion of the organic nitrogen less than 20%, the balance of organic nitrogen being provided by other nitrogen-containing compounds of animal or vegetable origin. Examples of suitable nitrogen-containing compounds of animal and vegetable origin are meat meal, fish meal, Scotch distillers solubles, soya bean meals and flours, peanut meal, dried autolysed yeast, casein hydrolysate, processed oat meal, fish solubles and corn meal. Under the heading of soya bean meals and flours are included Archer Daniels 44% soya bean oil meal, Archer Daniels 50% soya bean oil meal, Archer Daniels Nutrisoy flour and Archer Daniels Nutrisoy grits.

The corn steep liquor is preferably present in a quantity sufficient to provide about 3 to 7% of the organic nitrogen. Meat meal and/or fish meal have been found to be eminently suitable materials for providing the balance of the organic nitrogen and in one satisfactory medium the meat meal and fish meal are present in quantities sufficient to provide from 25 to 30% and 65 to 70% of the organic nitrogen respectively, the balance being provided by corn steep liquor. Another eminently suitable source for providing at least part of the organic nitrogen is Scotch distillers solubles.

As is the case with fermentation processes for the production of cephalosporin N it is preferable to have a proportion of ammonium acetate in the nutrient medium as a source of inorganic nitrogen. The proportion desirable for optimum yields of cephalosporin C, however, is in general lower than that for optimum yields of cephalosporin N. Thus in the case of cephalosporin C, a quantity of ammonium acetate sufficient to provide about 300 mgs. nitrogen/litre has been found to be adequate. The nitrogen value, as are all nitrogen values in this specification, is as determined by Kjeldahl's method.

It has also been discovered that the use of a particular mutant strain of Cephalosporium I.M.I. 49137 increases the yield of cephalosporin C. Thus mutant strain No. 8650 of a mould of Cephalosporium I.M.I. 49137 is the organism which is preferably used for the process of the invention. This mutant strain has moreover been found to be stable over a considerable length of time.

It has further been discovered that improved yields of cephalosporin C can be obtained by the presence in the nutrient medium of a quantity of calcium chloride and/or magnesium chloride. The calcium and/or magnesium chloride is preferably present in a total proportion of less than .2% by weight of the nutrient medium. Where Scotch distillers solubles are used as a source of organic nitrogen, however, they often already contain calcium and magnesium chlorides, in which case less or no advantage is to be gained by the separate addition of the salts to the nutrient medium.

The presence of the amino acid methionine in the nutrient medium also increases the yield of cephalosporin C. d-Methionine is most effective, but l-methionine does have a significant effect. Thus d-methionine is preferably used and as the amount of d-methionine in any nutrient medium is increased from zero, the yield of cephalosporin C obtainable also increases until the amount of d-methionine reaches a certain optimum value. Further increases of the d-methionine content have no effect until the quantity of d-methionine reaches a certain value considerably beyond the optimum value, when the beneficial effect begins to disappear and is finally lost. It is not possible to state an optimum value true for every nutrient medium but the optimum level for any particular nutrient medium can be readily determined by anyone skilled in the art. A proportion of from 0.025 to 0.1% has been found convenient in many cases.

Although d-methionine is the more active isomer, l-methionine and dl-methionine can be used without any harmful effect being caused, and, as dl-methionine is cheaper than d-methionine, it may be more convenient to use the racemic mixture in some cases.

The addition of ammonium sulphate to the nutrient medium also improves the yield of cephalosporin C obtained. As in the case of d-methionine it is not possible to state an optimum proportion of ammonium sulphate, but for a number of media a convenient range has been found to be about 0.05% to 0.2% by weight of the nutrient medium.

The effect of the presence of various carbohydrates in the nutrient medium has also been investigated. It has been found that the addition of one or more of particular carbohydrates, i.e. sucrose, glucose, lactose, and starch, to the nutrient medium increases the yield of cephalosporin C. Sucrose and glucose are the preferred sugars and best results have been obtained with a mixture of sucrose and glucose. The total amount of sugar present in the nutrient medium is preferably in the range of from 1 to 4% by weight, and the amount normally used is about 1.5%.

The addition of certain oils and/or fatty acids to the nutrient medium has also been investigated and found to be advantageous. Oils which are of use are olive oil, palm kernel oil, soya bean oil, maize oil, arachis oil and lard oil. A suitable fatty acid is oleic acid. The quantity of oil and/or fatty acid to be added to obtain optimum yields of cephalosporin C can be readily determined by simple experiment, and is in general in the range of 1 to 3% by volumes.

Cephalosporin C can be separated from the other antibiotically active materials and products of fermentation by methods as described in British Patent No. 810,196.

The following examples illustrate the invention:

EXAMPLE 1

A 5 litre stirred and aerated flask was prepared containing the following basic medium:

Meat meal to give _____ 300 mgms. $N_2$/l.
Fish meal to give _____ 700 mgms. $N_2$/l.
Corn steep liquor to give _____ 50 mgms. $N_2$/l.
Ammonium acetate to give _____ 350 mgms. $N_2$/l.
Sucrose _____ 12.0 gms.
Glucose _____ 3.0 gms.
DL-methionine _____ 0.5 gm.
Tap water to _____ 1,000 mls.

The hydrogen-ion value of the medium was adjusted to give a final pH of 6.5 to 6.8 and the medium was then steam sterilised at 15 lbs./sq. in. for 20 minutes.

The flask was then inoculated by 2% by volume of a growth of mutant strain 8650 of Cephalosporium I.M.I. 49137 which had been prepared by inoculating spores of the strain into the following medium:

Corn steep liquor to give _____ 800 mgms. $N_2$/l.
Ammonium acetate to give _____ 800 mgms. $N_2$/l.
Sucrose _____ 20.0 gms.
Tap water _____ 1,000 mls.

adjusting the medium to give a final pH of 6.5 to 6.8, steam sterilising at 15 lbs./sq. in. for 40 minutes and incubating the inoculated medium in a stirred/aerated flask for 70 hours at 24–26° C.

The inoculated flask containing the basic medium was then incubated at 27° C. for 70 hours. During this time an aeration level in the region of $KI_a 420$ or above was maintained by passing air through the medium, which was stirred at a rate of 600–900 r.p.m. The contents of the flask were then asayed for cephalosporin C and a titre of 1.58 units/ml. of cephalosporin C obtained as an average figure for 6 fermentations. This compares with a titre of 1.05 units/ml. of cephalosporin C in a similar fermentation process using a fermentation medium containing corn steep liquor as the only source of organic nitrogen.

EXAMPLE 2

Fermentations similar to that described in Example 1 were carried out, the fish meal and meat meal of Example 1 being replaced by various other sources of organic nitrogen. The results of these fermentations are given in the following table:

Table I

| Organic Nitrogen Source | Time of fermentation, hr. | Mean titre units/ml. | Number of fermentations (5 l. flasks) |
|---|---|---|---|
| Meat meal to give 300 mg. $N_2$/l.; Fish meal to give 700 mgm. $N_2$/l. | 70 | 1.58 | 2 |
| Scotch Distillers Solubles, 300 mgm. $N_2$/l. substituted for meat meal | 70 | 2.61 | 4 |
| Soya Bean Meal to give 300 mgms. $N_2$/l. substituted for meat meal | 70 | 1.45 | 8 |
| Soya Bean Flour and Processed Oat Meal to give 1,000 mgms. $N_2$/l. substituting both meat and fish meals | 94 | 1.95 | 4 |
| Peanut Meal, 600 mgm. $N_2$/l.; Distillers Solubles, 400 mgm. $N_2$/l.; Fish Meal, 300 mgm. $N_2$/l. substituted for the usual meat meal and fish meal | 71 | [1] 3.44 | 4 |
| Dried Autolysed Yeast, 300 mgm. $N_2$/l.; Distillers Solubles, 700 mgm. $N_2$/l. substituting meat and fish meals | 70 | 2.39 | 4 |
| Archer Daniels, 44% Soya Bean Oil Meal substituting both meat and fish meals | 70 | 1.56 | 4 |
| Archer Daniels, 50% Soya Bean Oil Meal substituting meat and fish meals | 70 | 1.28 | 4 |
| Archer Daniels Nutrisoy Flour substituting meat and fish meals | 70 | 1.22 | 4 |
| Archer Daniels Nutrisoy Grits substituting meat and fish meals | 70 | 1.48 | 4 |
| Hydrolysed Casein, 300 mgm. $N_2$/l.; Fish Solubles, 700 mgm. $N_2$/l. substituting meat and fish meals | 70 | 1.43 | 4 |
| Processed Oat Meal, 700 mgm. $N_2$/l.; Fish Solubles, 300 mgm. $N_2$/l. substituting meat and fish meals | 70 | 1.91 | 4 |
| Distillers Solubles, 700 mgm. $N_2$/l.; Corn Meal, 300 mgm. $N_2$/l. replacing meat and fish meals | 70 | 1.90 | 4 |

[1] Some acid stable antibiotic present other than cephalosporin C but approximately 2.6% cephalosporin C present.

EXAMPLE 3

Fermentations similar to that described in Example 1 were carried out with the addition of quantities of calcium chloride and magnesium chloride to the basic fermentation medium. In each case the fermentation time was 70 hours. The results obtained are shown in the following table:

Table II

| Supplement | Mean titre, units/ml. | Number of Fermentations |
|---|---|---|
| Calcium chloride, 0.05% | 1.85 | 4 |
| Magnesium chloride, $6H_2O$—0.05% | 2.04 | 4 |
| 0 | 1.62 | 4 |

EXAMPLE 4

Fermentations similar to that described in Example 1 were carried out with the addition of ammonium sulphate to the basic fermentation medium. The fermentation time was 70 hours. The results obtained are shown in the following table:

Table III

| Supplement | Mean titre, units/ml. | Number of Fermentations |
|---|---|---|
| No addition | 1.52 | 7 |
| Ammonium Sulphate, 0.72% w./v.+1% $CaCO_3$ | 2.03 | 8 |

EXAMPLE 5

Fermentations similar to that described in Example 1 were carried out with the addition of DL-methionine to the basic fermentation medium. The fermentation time was 70 hours in each case. The results are shown in the following table:

*Table IV*

| Addition of DL-methionine | Mean titre, units/ml. | No. of fermentations |
|---|---|---|
| 0.05% | 1.33 | 8 |
| 0 | 0.62 | 8 |

EXAMPLE 6

Fermentations similar to that described in Example 1 were carried out with the addition of certain carbohydrates to the fermentation medium. The fermentation time was in each case 70 hours. The results obtained using various carbohydrates given in Table V and the effect of using different proportions of the carbohydrates are shown in Table VI.

*Table V*

| Carbohydrate | Mean titre, units/ml. | No. of fermentations |
|---|---|---|
| Sucrose, 1.2% <br> Glucose, 0.3% | 2.05 | 4 |
| Starch, 1.2% <br> Glucose, 0.3% | 1.84 | 4 |
| Lactose, 1.2% <br> Glucose, 0.3% | 1.60 | 4 |
| Lactose, 1.2% <br> "Cerelose," 0.3% | 2.0 | 4 |

*Table VI*

| Carbohydrate | Mean titre, units/ml. | No. of fermentations |
|---|---|---|
| Glucose, 0.3% <br> Sucrose, 1.2% | 1.77 | 4 |
| Glucose, 0.5% <br> Sucrose, 2.0% | 1.49 | 4 |

EXAMPLE 7

Fermentations similar to that described in Example 1 were carried out with the addition of certain animal oils, vegetable oils and fatty acids to the basic fermentation medium. The fermentation time was in each case 70 hours. The results obtained are shown in the following table:

*Table VII*

| Oil or Fat Added | Oil or fat Added in Concentration of 1.85 v./v. | | Oil or Fat (1.85%)+ Sucrose (1.2%) and Glucose (0.3%) Added | |
|---|---|---|---|---|
| | Mean Titre, units/ml. | No. of Fermentations | Mean, Titre, units/ml. | No. of Fermentations |
| No Oil | ¹0.58 | 4 | ¹1.38 | 4 |
| Olive Oil | 2.26 | 3 | 2.02 | 4 |
| Palm Kernel Oil | 2.45 | 3 | 2.35 | 4 |
| Soya Bean Oil | 2.13 | 4 | 1.94 | 4 |
| Maize Oil | 2.13 | 4 | 2.09 | 4 |
| Arachis Oil | 1.93 | 3 | 2.05 | 4 |
| Lard Oil | 1.61 | 4 | 1.72 | 4 |
| Oleic Acid | 1.40 | 4 | 1.25 | 4 |

¹ In these cases, no oil was present in the fermentation medium.

EXAMPLE 8

70 gallons of basic fermentation medium of the same constitution proportionally as the medium described in Example 1 was prepared in a 100 gallon stainless steel, jacketed fermenter.

The fermenter was inoculated with 2% by volume of a growth of mutant strain No. 8650 and the fermentation carried on under the same conditions for the same length of time as given in Example 1. The cephalosporin C mean titre in units/ml. was 1.59.

BIOLOGICAL ASSAY PROCEDURE

The fermentation broths obtained from all the fermentations described in Examples 1 to 8 were assayed against *Vibrio cholerae*. The strain used was an attenuated laboratory strain, *V. cholerae* 1077. The medium used for its growth is as follows:

| | | |
|---|---|---|
| Concentrated papain broth | mls | 400 |
| Yeast extract | gms | 2.5 |
| NaCl | gms | 5.0 |
| Trace elements | ml | 1.0 |
| Distilled water | mls | 600 |
| Agar | gms | 7.5 |
| pH 7.0 | | |

A thin layer of this medium is poured on to a base layer of nutrient agar (2% agar). The plates are placed open, in an incubator to dry for one to two hours. The inoculum is a four-hour culture of *V. cholerae* in papain broth. The surface of the plate is well flooded with the culture, and the excess removed by pipette. This gives an even layer of surface growth. The plates are allowed to dry in the incubator for a further hour, then the antibiotic is added. Since there is only 0.75% agar in the medium, it is too soft for holes to be cut in it, therefore the samples are added by means of sterile filter paper discs, soaked in the sample and placed on the surface of the plate. Plates are incubated overnight at 32° C. The zones of inhibition formed are surrounded by a darker, thicker zone, due to abnormal growth of the *V. cholerae*. The outer edge of this zone is measured to give the zone diameter used to calculate titres.

With good lighting conditions for measuring zones the outer edge of this zone is fairly sharp, and by measuring this much lower levels of cephalosporin C can be detected than by measuring the zone of true inhibition which itself does not have a clear cut edge.

Before estimating cephalosporin C in the fermentation broth, it is necessary to treat the broth with acid. Thus the sample of the broth is acidified to between pH 2 to 3, with 2 M-ortho-phosphoric acid ($H_3PO_4$). A pH below 2.5 is desirable, but a sample may act as a buffer and it is advisable to leave the pH between 2.5 and 3.0 rather than to dilute the sample by adding large volume of acid. The acidified sample is held at 37° in a water bath for two hours. The pH of the solution is then checked and the solution neutralised with N-sodium hydroxide. It is then incubated at 37° for a further hour. It is essential during this incubation that the pH should not rise above 7.5, as the cephalosporin C would then be destroyed. The samples are then diluted where necessary with phosphate buffer and are ready for assay against *V. cholerae*.

The standard against which the titre results in the examples are given is provided by the definition of 1 unit of cephalosporin. This is the quantity of cephalosporin C contained in 0.13 m. of a master standard preparation of crystalline cephalosporin C, prepared by M.R.C. Clevedon, in June, 1958.

We claim:

1. A process for the production of cephalosporin C by the culture of a cephalosporin C-producing mould of the species of which Cephalosporium I.M.I. 49137 is a member in a medium containing suitable nutrient materials therefor, including a source of organic nitrogen in the presence of molecular oxygen and the separation of cephalosporin C thereby produced wherein the organic nitrogen source includes corn steep liquor present in a quantity sufficient to provide a proportion of the organic nitrogen less than 20% of the total.

2. A process according to claim 1 in which the corn steep liquor provides 3 to 7% of the organic nitrogen.

3. A process according to claim 1 in which the balance of organic nitrogen is provided by at least one substance selected from meat meal and fish meal.

4. A process according to claim 3 in which the mea meal and fish meal are present in quantities sufficient to provide from 25 to 30% and 65 to 70% respectively of the organic nitrogen, the balance being provided by the corn steep liquor.

5. A process according to claim 1 in which the nutrient medium contains a quantity of ammonium acetate.

6. A process according to claim 1 in which the cephalosporin C-producing mould is mutant strain No. 8650 of a mould of Cephalosporium I.M.I. 49137.

7. A process according to claim 1 in which the nutrient medium contains a quantity of at least one compound selected from calcium chloride and magnesium chloride.

8. A process according to claim 7 in which the compound is present in a total proportion of less than .2% by weight of the nutrient medium.

9. A process according to claim 1 in which the nutrient medium contains a quantity of methionine.

10. A process according to claim 9 in which the methionine is d-methionine.

11. A process according to claim 1 in which the nutrient medium contains a quantity of ammonium sulphate.

12. A process according to claim 11 in which the ammonium sulphate is present in a proportion by weight in the range of 0.05% to 0.2%.

13. A process according to claim 1 in which the nutrient medium contains a carbohydrate selected from sucrose, glucose, lactose and starch.

14. A process according to claim 13 in which the carbohydrate is present in a proportion by weight in the range of 1 to 4%.

15. A process according to claim 13 in which the nutrient medium also contains a quantity of an oil selected from olive oil, palm kernel oil, soya bean oil, maize oil, arachis oil and lard oil.

16. A process according to claim 1 in which the nutrient medium contains a quantity of a fatty acid.

17. A process according to claim 16 in which the fatty acid is oleic acid.

18. A process according to claim 15 in which the combined quantity of carbohydrate and oil is a proportion by volume of the nutrient medium in the range of 1 to 3%.

References Cited in the file of this patent

UNITED STATES PATENTS 2,831,797    Miller et al. _____ Apr. 22, 1958